United States Patent
Joshi et al.

(10) Patent No.: US 8,767,713 B2
(45) Date of Patent: *Jul. 1, 2014

(54) APPARATUS AND METHOD FOR ALLOWING PAGE MONITORING OF A COMMUNICATION SYSTEM DURING TRAFFIC/BROADCAST CHANNEL OPERATION WITHOUT REDUCING TRAFFIC PERFORMANCE

(75) Inventors: Abhay Arvind Joshi, San Diego, CA (US); Arthur James Neufeld, Longmont, CO (US); Steven C. Ciccarelli, Ramona, CA (US); Simon Turner, San Diego, CA (US); Gregory Robert Lie, San Diego, CA (US); Serguei A. Glazko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 994 days.

This patent is subject to a terminal disclaimer.

(21) Appl. No.: 11/357,265

(22) Filed: Feb. 17, 2006

(65) Prior Publication Data

US 2006/0209801 A1 Sep. 21, 2006

Related U.S. Application Data

(60) Provisional application No. 60/655,626, filed on Feb. 22, 2005.

(51) Int. Cl.
*H04L 12/66* (2006.01)

(52) U.S. Cl.
USPC ........... 370/352; 370/229; 370/328; 370/342; 370/349; 455/82; 455/458; 455/552.1

(58) Field of Classification Search
USPC .................................. 370/351, 352; 455/552
See application file for complete search history.

(56) References Cited

U.S. PATENT DOCUMENTS

| | | | |
|---|---|---|---|
| 5,103,459 A | 4/1992 | Gilhousen et al. | |
| 5,830,064 A | 11/1998 | Bradish et al. | |
| 6,738,373 B2* | 5/2004 | Turner | 370/352 |
| 7,181,171 B2* | 2/2007 | Forrester | 455/82 |
| 7,359,347 B2 | 4/2008 | Ahmavaara et al. | |
| 7,953,424 B2* | 5/2011 | Turner et al. | 455/458 |
| 2001/0000706 A1* | 5/2001 | Butler et al. | 375/340 |
| 2003/0043928 A1* | 3/2003 | Ling et al. | 375/267 |
| 2003/0152044 A1* | 8/2003 | Turner | 370/328 |
| 2004/0037222 A1* | 2/2004 | Kim et al. | 370/229 |
| 2004/0152429 A1 | 8/2004 | Haub et al. | |
| 2004/0179495 A1 | 9/2004 | Ramakrishnan et al. | |
| 2004/0202133 A1* | 10/2004 | Filipovic | 370/332 |
| 2005/0227631 A1* | 10/2005 | Robinett | 455/83 |
| 2006/0111115 A1* | 5/2006 | Marin et al. | 455/442 |

* cited by examiner

*Primary Examiner* — Ayaz Sheikh
*Assistant Examiner* — Hai-Chang Hsiung
(74) *Attorney, Agent, or Firm* — Kevin T. Cheatham (57) ABSTRACT

A system and method of conducting wireless communications between a wireless communication device (WCD) and both a first network (e.g., IS-2000) supporting voice and data services and a second network (e.g., IS-856) supporting packet data services. The method comprises providing the WCD with a primary transceiver and a secondary receiver for conducting wireless communications in a spatial diversity for the second network traffic or broadcast; disabling the secondary receiver and spatial diversity before a paging slot or 1x system acquisition and synchronization attempts; tuning the secondary receiver to a first network carrier frequency to perform first network activities; and retuning the secondary receiver to a second network carrier frequency for spatial diversity after performing the first network activities. The first network activities may include pilot set maintenance, overhead message maintenance, page match detection, or 1x system acquisition and synchronization attempts.

57 Claims, 6 Drawing Sheets

APPARATUS AND METHOD FOR ALLOWING PAGE MONITORING OF A COMMUNICATION SYSTEM DURING TRAFFIC/BROADCAST CHANNEL OPERATION WITHOUT REDUCING TRAFFIC PERFORMANCE

CLAIM OF PRIORITY UNDER 35 U.S.C. §119

The present Application for Patent claims priority to Provisional Application No. 60/655,626, entitled "Method to Allow Page Monitoring of IS200/IS95 System," filed Feb. 22, 2005, which is expressly incorporated herein by reference.

REFERENCE TO CO-PENDING APPLICATIONS FOR PATENT

The present Application for Patent is related to the following co-pending U.S. Patent Application: "Apparatus and Method for Improving Paging Performance while Simultaneously Operating in Different Types of Communication Networks" by Abhay Joshi et al., having U.S. Provisional Patent Application No. 60/656,282, filed Feb. 24, 2005, and assigned to the assignee hereof, which is expressly incorporated herein by reference.

BACKGROUND

1. Field

The present invention generally relates to wireless communications and, in particular, to wireless communication systems and methods for allowing page monitoring of a communication system during 1xEV-DO traffic and without reducing 1xEV-DO traffic performance.

2. Background

As mobile communication systems become more prevalent in society, the demands for greater and more sophisticated services have grown. To meet the capacity needs of mobile communication systems, techniques for multi-user access to a limited communication resource have been developed. The use of Code Division Multiple Access (CDMA) modulation techniques is one of several techniques for facilitating communications in which a large number of system users are present. Other multiple access communication system techniques, such as Time Division Multiple Access (TDMA) and Frequency Division Multiple Access (FDMA) are known in the art. However, the spread spectrum modulation technique of CDMA has significant advantages over these modulation techniques for multiple access communication systems.

Presently, there are many different types of communication networks offering services to users. Some types of communication networks are optimized for providing both voice and relatively slow data-rate data services to a user. Such communication networks include networks operating in accordance with IS-2000 or the Global System for Mobile (GSM) Communications standards, for example. On the other hand, other types of communication networks are optimized for providing efficient, relatively high-speed packet data services to the user. Such communication networks include High Data Rate (HDR) networks operating in accordance with the IS-856 communication standard, for example.

The user typically accesses voice and/or data services associated with the different types of communication networks using a mobile terminal (referred to herein as a Wireless Communication Device (WCD)). However, conventional WCDs are typically capable of operating over only one type of communication network, such as with an IS-2000 network system, or alternatively, with an IS-856 network system. Therefore, such conventional WCDs do not individually provide optimized communication services to the user through both types of communication networks. As a result, the user may need to use multiple, different WCDs should the user wish to utilize the optimized services available on the different networks. Stated another way, there has been a need for a WCD capable of operating over the above-mentioned different types of networks. Therefore, the Applicant has provided a user of the WCD with optimized voice and data services over multiple types of networks with an invention that is capable of establishing data sessions on both a first network (such as an IS-2000 network) supporting voice and data services, and a second network (such as an IS-856 network) supporting packet data services. The invention for the above is disclosed in U.S. Pat. No. 6,738,373 to Turner, entitled "Wireless Communication Device Operable on Different Types of Communication Networks," issued May 18, 2004, which is assigned to the assignee of the present application. There is still a further need in the art, however, for an apparatus and method for allowing page monitoring of a communication system during 1xEV-DO traffic and without reducing 1xEV-DO traffic performance as defined in "Simultaneous 1xEV-DO Traffic and 1x Paging," Doc. No. 80-V9819-1C, which is incorporated herein by reference.

SUMMARY

The invention relates to a system and method of conducting wireless communications between a wireless communication device and both a first network supporting voice and data services and a second network supporting packet data services. The method comprises providing the WCD with a primary transceiver and a secondary receiver for conducting wireless communications in a spatial diversity for the second network traffic or broadcast; disabling the secondary receiver and spatial diversity before a paging slot or 1x system acquisition and synchronization attempts; tuning the secondary receiver to a first network carrier frequency to perform first network activities; and retuning the secondary receiver to a second network carrier frequency for spatial diversity after performing the first network activities. The first network may be an IS-2000 network, and the second network may be an IS-856 network. The first network activities may include pilot set maintenance, overhead message maintenance, page match detection or 1x system acquisition and synchronization attempts. With this aspect, the communications on the second network remain uninterrupted on the primary transceiver. Moreover, the process is repeated for each subsequent first network paging slot or 1x system acquisition and synchronization attempt. It is appreciated that the throughput and latency are improved over the Hybrid-mode operation because the traffic communications is not interrupted.

In another aspect, the invention discloses a system and method of conducting wireless communications between a WCD and a first network supporting voice and data services, a second network supporting packet data services and a third network supporting Global Positioning System (GPS). The method comprises providing the WCD with a primary transceiver and a secondary receiver, the primary transceiver being used for conducting communications in the second network, and the secondary receiver being used for simultaneously conducting wireless communications in the first network; disabling the secondary receiver from performing second network activities and switching the WCD to use the primary transceiver to perform both first network activities and the second network activities in a time multiplexed fashion; tuning the secondary receiver to a third network carrier frequency to perform GPS activities; and disabling the secondary receiver and switching the WCD to use the primary transceiver for conducting communications in the second network after performing the GPS activities, and the secondary receiver again being used for simultaneously conducting wireless communications in the first network. The first network may be an IS-2000 network, the second network may be an IS-856 network, and the GPS activities may include a GPS location fix or GPS data demodulation. With this aspect, the process is performed at each first network paging slot, and the throughput and latency are improved over a Hybrid-mode operation because the traffic communications is not interrupted.

In yet another aspect, the invention discloses a system and method of conducting wireless communications between a WCD and a first network supporting voice and data services, a second network supporting packet data services, and a third network supporting GPS. The method comprises providing the WCD with a primary transceiver and a secondary receiver, the primary transceiver being used for conducting communications in the second network, and the secondary receiver being used for simultaneously conducting wireless communications in the first network; disabling the primary transceiver from performing second network activities and switching the WCD to use the primary transceiver to perform transmission activities in the first network; and disabling the primary transceiver from performing first network activities and switching the WCD to use the primary transceiver to perform the second network activities after completion of the transmission activities, the secondary receiver being used for simultaneously performing the first network activities. With this aspect, the transmission activities may include registration attempts, call originations and access channel transmissions. This process is also performed at each first network paging slot.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an Access Terminal (AT), may be mobile or stationary, and may communicate with one or more HDR base stations, referred to herein as Modem Pool Tranceivers (MPTs). An AT transmits and receives data packets through one or more MPTs to an HDR base station controller, referred to herein as a Modem Pool Controller (MPC). MPTs and MPCs are parts of a network called an Access Network (AN). An AN transports data packets between multiple ATs. The AN may be further connected to additional networks outside the AN, such as a corporate intranet or the Internet, and may transport data packets between each AT and such outside networks. An AT that has established an active traffic channel connection with one or more MPTs is called an active AT, and is said to be in a traffic state. An AT that is in the process of establishing an active traffic channel connection with one or more MPTs is said to be in a connection setup state. An AT may be any data device that communicates through a wireless channel or through a wired channel, for example using fiber optic or coaxial cables. An AT may further be any of a number of types of devices including but not limited to a PC card, a compact flash, an external or internal modem, or a wireless or wireline phone. The communication link through which the AT sends signals to the MPT is called a reverse link. The communication link through which a MPT sends signals to an AT is called a forward link.

Different standards employed by packet data and voice networks pose a problem for dual mode or hybrid ATs. For example, the packet data network may employ a different communication protocol from the voice network. In some cases, the different communication protocols used by the different radio networks prevent sharing information between radio networks or interworking to facilitate dual mode operation. Thus, the AT must maintain communications with two incompatible radio networks. That is, the AT must comply with the communication protocols of both radio networks.

Currently, there exists hybrid ATs that are capable of dual mode operation in an IS-856 network and an IS-2000 network. In the IS-856 network, these ATs are expected to transmit continuously on a Reverse Traffic Channel (RTC), monitor a forward control channel, and demodulate a Reverse Link Power Control (RPC) channel, while their connection to the radio network is open as further described below. At the same time, these ATs must be able to receive page requests that are sent from a plurality of Mobile Switching Centers (MSCs) via the IS-2000 radio network while maintaining their connection with the IS-856 radio network. Such page requests may be intended for voice call delivery or Short Message Service (SMS) delivery, or delivery of other services. These ATs must also be able to perform certain procedures required by the IS-2000 radio network, such as idle handoff procedure, registration procedures, as well as many other idle state procedures.

Figure 1:
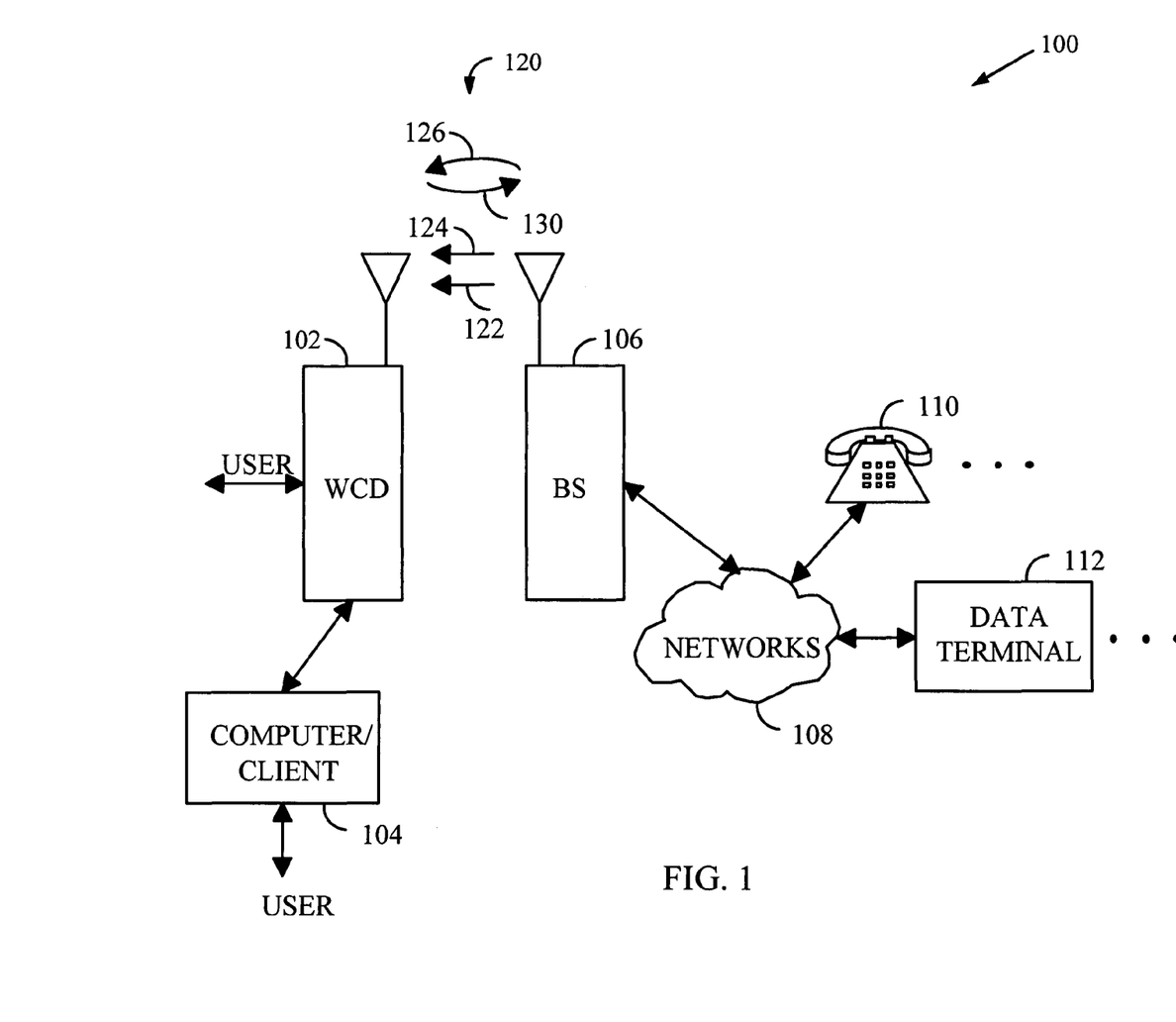
FIG. 1 is a diagram of a network environment in which a Wireless Communication Device (WCD) may operate.

Referring to FIG. 1, there is shown a block diagram of an example network environment 100 in which a hybrid AT may operate. Hybrid AT 102 is a WCD capable of operating with different types of communication networks. Hybrid AT 102 (also referred to as WCD 102) may communicate with a first network operating in accordance with a first set of communication standards, and in addition, WCD 102 may communicate with a second network operating in accordance with a second, different set of communication standards. In an exemplary configuration of WCD 102, the WCD 102 may provide voice, data, and data messaging services to a user of the WCD 102 over networks operating in accordance with IS-2000 standards. Moreover, WCD 102 may provide packet data services to a user of the WCD 102 over networks operating in accordance with IS-856 standards. For illustrative purposes, the present invention is described in the context of WCD 102 operating on IS-2000 and IS-856 networks. However, it is to be understood that the present invention is not limited to such illustrative networks. Other configurations of WCD 102 may connect to and operate on other combinations of networks, including networks operating in accordance with GSM standards, for example.

WCD 102 may operate on each of the above-mentioned first and second different types of networks, and may also be capable of handing-off data calls between the first and second network, in the manner described below. These capabilities of WCD 102 enable a single AT (i.e., WCD 102) to provide voice, data and short messaging services on the first network and to provide efficient, high-speed packet data services on the second network.

Referring back to FIG. 1, example network environment 100 includes a computer/client 104 coupled to WCD 102. The user may access data services through computer/client 104. System 100 also includes a base station 106 coupled to multiple networks 108. Base station 106 operates in accordance with either or both the first communication standards (for example, IS-2000) and/or the second communication standards (for example, IS-856). Networks 108 may include the Public Switched Telephone Network (PSTN), multiple Packet Switched Data Networks, the Internet, and so on. One or more of networks 108 operate in accordance with the first communication standards, and one or more of the networks operate in accordance with the second communication standards. Voice terminals 110 and data terminals 112, such as computer/servers, may be connected to base station 106 through networks 108.

With regard to data services, base station 106 is coupled to one or more Packet Data Serving Nodes (PDSNs) included in networks 108. A PDSN routes data packets received from base station 106 to an appropriate data network in data networks 108, and thus, to a destination device (such as data terminal 112). Additionally, the PDSN routes data packets from a network source (such as data terminal 112), and destined for WCD 102, to base station 106.

WCD 102 inter-operates with base station 106, and thus with networks 108 and terminals 110 and 112, over an air interface 120 between WCD 102 and base station 106. Air interface 120 operates in accordance with the first and/or second communication standard depending on whether base station 106 is part of the first and/or second network. In an exemplary configuration, air interface 120 includes a pilot channel 122 transmitted by base station 106, a paging channel 124 transmitted by base station 106, a forward-link traffic channel 126 transmitted by base station 106, and a reverse-link traffic channel 130 transmitted by WCD 102.

Figure 2:
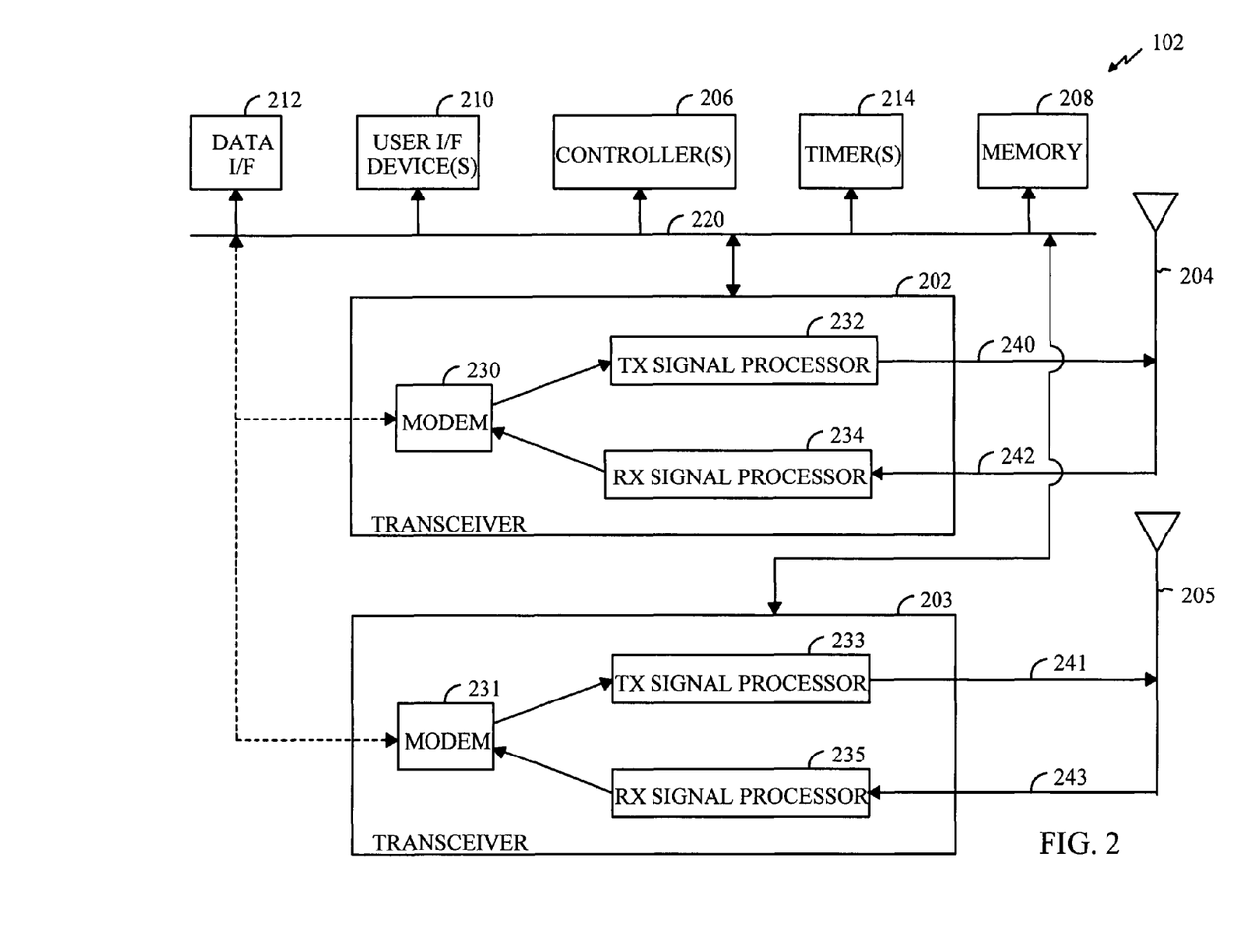
FIG. 2 is a block diagram of the WCD of FIG. 1.

FIG. 2 is a block diagram of WCD 102, which includes a first transmitter-receiver (transceiver) section 202 coupled to a primary antenna 204 and a second receiver section 203 coupled to a secondary antenna 205. It should be noted that receiver section 203 could be a transmitter-receiver (transceiver) section as illustrated in FIG. 2. WCD 102 also includes a controller (or a plurality of controllers) 206, a memory 208, user interface devices 210, a data interface 212, and one or more timer(s) 214, all coupled to one another, and to first transceiver 202 and second receiver 203, over a common data bus 220. The above-mentioned functions/elements of WCD 102 may exchange information/data with one another over data bus 220. Timer(s) 214 include a Dual-Dormancy Timer for establishing a Dormancy time-out period as described in U.S. Pat. No. 6,738,373. Timer(s) 214 may be part of controller 206, which may be implemented in hardware, software or a combination thereof. Controller 206 may program timer(s) 214, start and stop the timer(s) 214, and may be responsive to an expiration of the timer(s) 214.

Data interface 212 receives data from and transmits data to a computer (such as computer 104) coupled to the data interface 212. User interface devices 210 may include voice interface devices such as a speaker and a microphone, a keypad for entering information into WCD 102, and a display for displaying information to a user of device 102. Controller 206 controls the overall operation of WCD 102, and executes computer programs stored in memory 208. Memory 208 stores the computer programs along with information necessary for the operation of WCD 102.

Transceiver 202 includes a modem 230 coupled with a transmit signal processor 232 for processing voice and data based signals from primary antenna 204. Receiver 203 includes a modem 231 coupled with a receive signal processor 235 for processing voice and data based signals from secondary antenna 205. In another aspect, receiver 203 may be a transceiver including a modem 231 coupled with a transmit signal processor 233 for processing voice and data based signals from secondary antenna 205. Modems 230, 231 include analog and/or digital modulators and demodulators functions for modulating and demodulating voice and data based signals in accordance with the communication standards associated with the first and second networks as mentioned above. More specifically, modems 230, 231 provide voice and/or data signal formatting, encoding, interleaving, modulating functions, decoding, de-interleaving, and demodulating functions.

Transmit signal processor 232 includes digital and/or analog signal processing components for frequency-up converting modulated data from modem 230. In particular, transmit signal processor 232 provides transmit signal 240 to primary antenna 204. Primary and secondary antennas 204, 205 provide received signals 242, 243 to receive signal processors 234, 235, respectively. Receive signal processors 234, 235 frequency down-convert received signals 242, 243 and provide the down-converted received signals 242, 243 to modems 230, 231, respectively. The primary and secondary antennas 204, 205 transmit signals to and receive signals from base station 106 over air interface 120 as illustrated in FIG. 1.

A feature of the WCD 102 is that it provides an increased realizable throughput and decreased latency over IS-856 radio networks functioning in Hybrid-mode operation with IS-2000 networks. In particular, the WCD 102 of the invention provides simultaneous 1xEV-DO traffic and 1x paging feature.

A 1xEV-DO hybrid AT is capable of operating on both IS-2000 and IS-856 radio networks. For the terminal to function on both networks with only one antenna/transceiver pair, operation is time multiplexed in a cooperative fashion referred to as Hybrid-mode. While Hybrid-mode is designed to sacrifice as little as possible in IS-2000 and IS-856 performance, the IS-856 best-case throughput and worst-case latency incur a penalty, and the IS-856 broadcast service may be interrupted due to the time multiplexed use of the radio interface.

The most common IS-2000 operation, which affects the IS-856 performance, is idle slotted mode operation. To ensure that the IS-2000 modem does not miss incoming pages during IS-856 traffic, the IS-856 modem periodically suspends the IS-856 traffic connection and allows the IS-2000 modem to decode the paging channel. This causes periods where no data between the AT and the AN may be transferred in either direction.

With the present WCD 102, there is a Simultaneous-mode of operation that is designed to reduce the IS-2000 slotted mode's effect on the IS-856 traffic and broadcast service. In the Simultaneous-mode, a secondary receiver is provided as illustrated in FIG. 2 that is used for the IS-2000 slotted mode operation while the IS-856 traffic continues on the primary transceiver simultaneously. It should be noted that the Simultaneous-mode does not benefit the IS-2000 modem performance. However, the Simultaneous-mode is intended to provide benefit to the IS-856 while not adversely affecting the IS-2000 performance.

Simultaneous-Mode Usage

The Simultaneous-mode may be invoked during the following scenarios:

(1) IS-856 access with IS-2000 slotted paging;
(2) IS-856 traffic with IS-2000 slotted paging; and
(3) IS-856 broadcast with IS-2000 slotted paging.

All other IS-2000 and IS-856 mode combinations use traditional Hybrid-mode, which permits only one air interface at a time to use the radio, e.g., when the IS-2000 modem loses service during the IS-856 traffic, the IS-2000 system has to reacquisition functions in the Hybrid-mode and, as a result, periodically interrupts the IS-856 traffic.

The following summarizes the typical reasons the Simultaneous-mode may be interrupted while the IS-856 modem is in a traffic, access or broadcast connection:

(1) The IS-2000 modem may need to scan for a more preferred system within the current geographical region;
(2) The IS-2000 modem may lose service and reenter system acquisition;
(3) The IS-2000 modem may determine that the RF conditions warrant the more sensitive primary receiver so that IS-2000 paging performance is not adversely affected;
(4) The IS-2000 modem may need to register when in timer-based or zone-based registration modes; and
(5) The IS-2000 modem may originate a call or respond to a page.

In addition, the IS-856 nontraffic-related operations are always performed in the Hybrid-mode regardless of the state of the IS-2000 modem. Finally, since the quality of the second receiver is typically lower than that for the primary receiver, the scenarios supported by the Simultaneous-mode will function in the Hybrid-mode during low receiver power conditions so that the IS-2000 paging performance does not suffer.

Simultaneous-Mode Operation

Figure 3A:
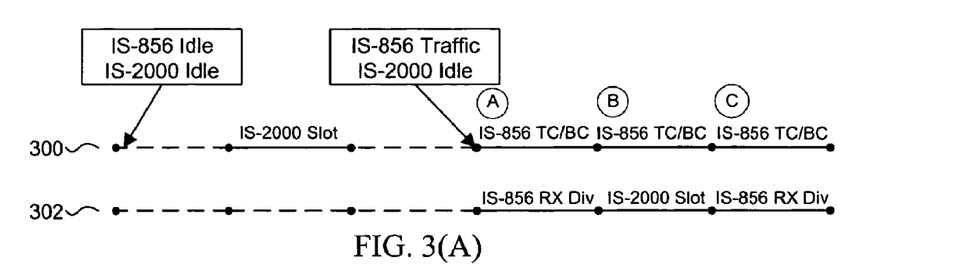
FIG. 3(A) illustrates a Simultaneous-mode operation and transceiver use.

The following explains the Simultaneous-mode operation, which is invoked during the Hybrid-mode operation when the AT is in an active IS-856 traffic or broadcast connection, while also in an IS-2000 idle slotted paging mode operation. In a slotted paging scheme, pages directed to a particular AT are transmitted only during specified time slots. Referring to FIG. 3(A), there is illustrated the allocation of a primary transceiver 300 and a secondary receiver 302. More specifically, the dotted lines represent periods where the given transceiver is not in use, while solid lines represent periods where the transceiver is used by the specified technology.

When the IS-856 traffic and IS-2000 idle session begins (denoted as A in FIG. 3(A)), the IS-856 modem uses both the primary transceiver 300 and the secondary receiver 302 of the AT for the purposes of spatial diversity for IS-856 traffic. Before the IS-2000 wake-up slot arrives, the AT disables the secondary receiver 302, effectively disabling the Diversity mode, and then retunes the secondary receiver 302 to the IS-2000 carrier frequency (at B in FIG. 3(A)). The AT then proceeds to perform all IS-2000 pilot set maintenance, overhead message maintenance, page match detection or 1x system acquisition and synchronization attempts while the IS-856 traffic connection remains uninterrupted on the primary transceiver 300. After the IS-2000 activities are completed for that slot, the secondary receiver 302 is retuned to the IS-856 carrier and spatial receive diversity resumes (at C in FIG. 3(A)). This behavior repeats for each IS-2000 slot wakeup. Since the IS-856 traffic connection is never interrupted, both the throughput and latency on the reverse link and forward link are improved over the Hybrid-mode operation.

For all other non-Simultaneous-modes, the primary transceiver 300 is time shared between IS-2000 and IS-856. Therefore, only one air interface uses the radio at a time.

Figure 3B:
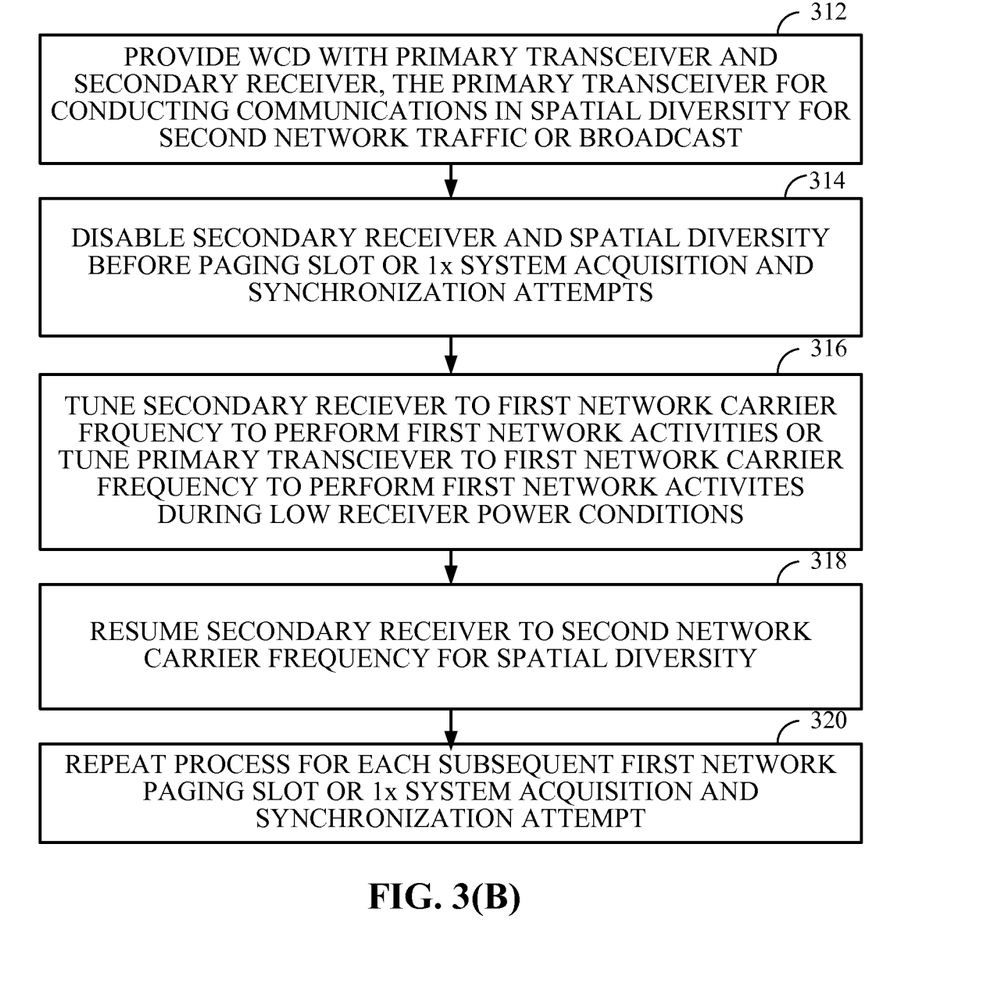
FIG. 3(B) is a flowchart illustrating the Simultaneous-mode operations of FIG. 3(A)

Referring to FIG. 3(B), there is shown a flowchart illustrating the Simultaneous-mode operations of the invention. In particular, a process of conducting wireless communications between a WCD and both a first network (e.g., IS-2000) supporting voice and data services and a second network (e.g., IS-856) supporting packet data services is disclosed. At step 312, the invention provides the WCD with a primary transceiver and a secondary receiver for conducting wireless communications in a spatial diversity for the second network traffic or broadcast. Next, the process disables the secondary receiver and spatial diversity before a paging slot or 1x system acquisition and synchronization attempts at step 314; then tunes the secondary receiver to a first network carrier frequency to perform first network activities during normal power conditions at step 316 or, in the alternative, tunes the primary transceiver to the first network carrier frequency to perform first network activates during low power conditions at step 316. After performing the first network activities, the secondary receiver is retuned to a second network carrier frequency for spatial diversity at step 318. The process is repeated for each subsequent first network paging slot or 1x system acquisition and synchronization attempt at step 320. The first network activities may include pilot set maintenance, overhead message maintenance, page match detection or 1x system acquisition and synchronization attempts. During normal power conditions, the communications on the second network remain uninterrupted on the primary transceiver, and the throughput and latency are improved over the Hybrid-mode operation because the traffic communications is not interrupted.

Hybrid-Mode Operation

Figure 4:
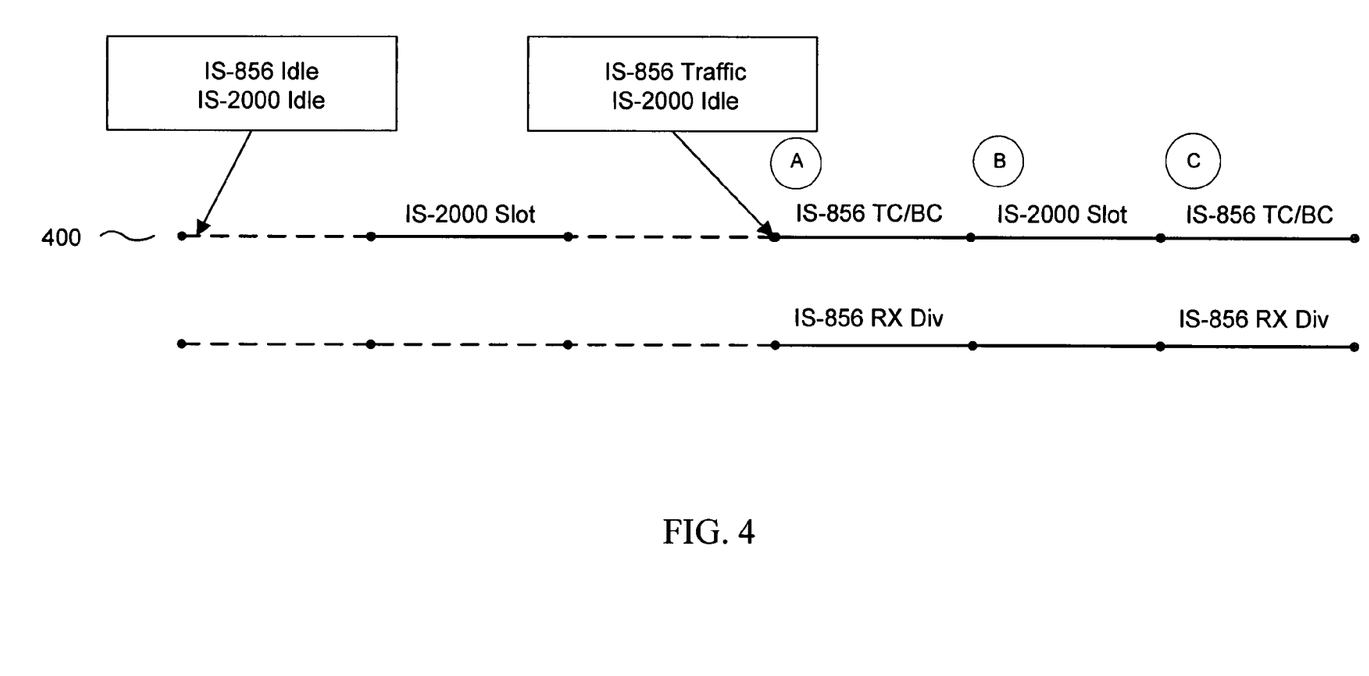
FIG. 4 illustrates a Hybrid-mode operation and transceiver use.

The Hybrid-mode contrasts with the Simultaneous-mode. That is, in the Hybrid-mode, a primary transceiver 400 as illustrated in FIG. 4 is time shared or multiplexed during all IS-2000 and IS-856 mode combinations. At B in FIG. 4, the transceiver 400 is used by IS-2000 during a paging slot and IS-856 is preempted. When the AT is not in IS-856 traffic or broadcast, or is not in an IS-2000 paging slot, there is no change to the system design since the Simultaneous-mode is never engaged.

Simultaneous-Mode Interactions with GPS

Figure 5A:
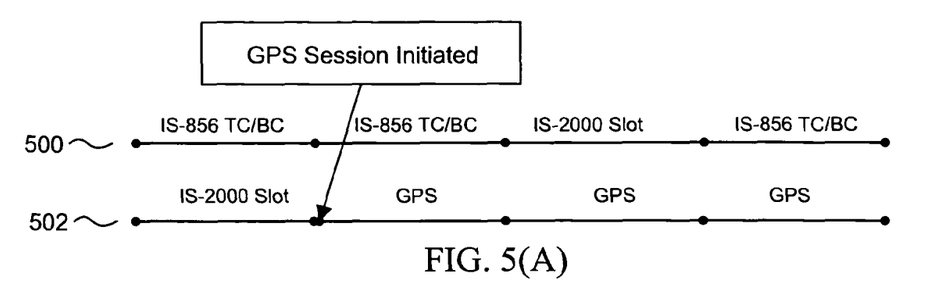
FIG. 5(A) illustrates a Simultaneous-mode interaction with simultaneous GPS/IS-856 and receiver use.

Referring to FIG. 5(A), for platforms that do support simultaneous GPS and IS-856 operation, GPS assumes control over a secondary receiver 502 and forces the IS-2000 modem to use a primary receiver 500 for IS-2000 slot wakeups. However, IS-856 is only preempted during IS-2000 slot wakeups. This causes the IS-856 and IS-2000 modems to function in Hybrid-mode as illustrated in FIG. 5(A).

Figure 5B:
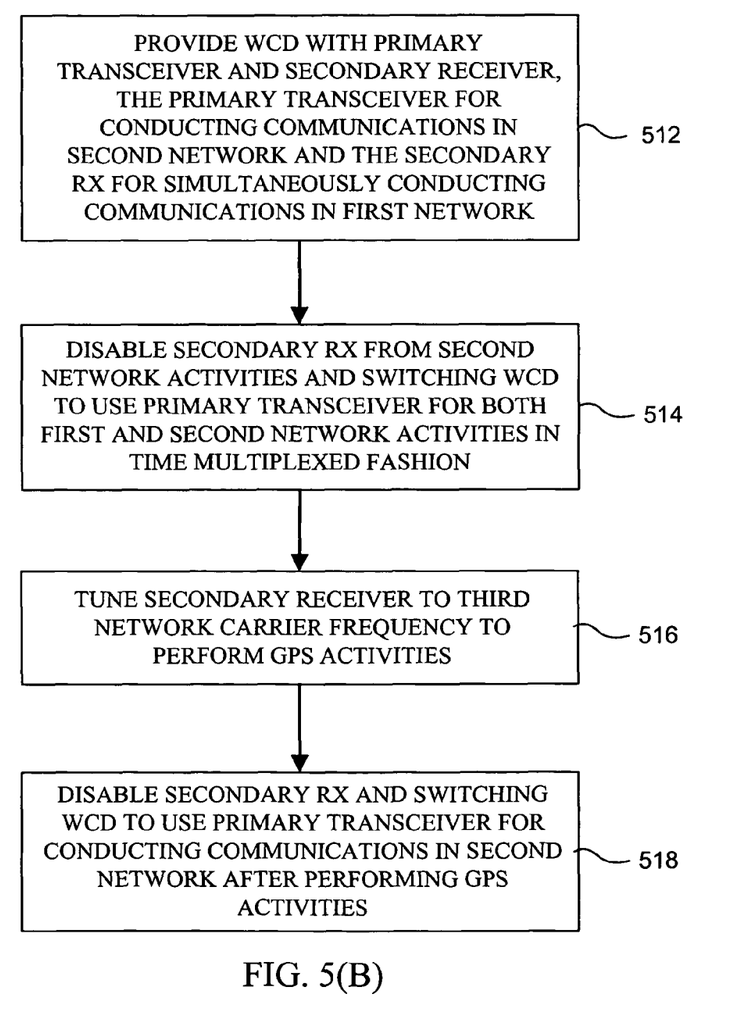
FIG. 5(B) is a flowchart illustrating the operations of FIG. 5(A).

Referring to FIG. 5(B), there is shown a flowchart illustrating the operations of FIG. 5(A). In particular, a process of conducting wireless communications between a WCD and a first network (e.g., IS-2000) supporting voice and data services, a second network (e.g., IS-856) supporting packet data services and a third network supporting GPS is disclosed. With this aspect, the invention provides the WCD with a primary transceiver and a secondary receiver, the primary transceiver being used for conducting communications in the second network, and the secondary receiver being used for simultaneously conducting wireless communications in the first network at step 512; disabling the secondary receiver from performing first network activities and switching the WCD to use the primary transceiver to perform both first network activities and the second network activities in a time multiplexed fashion at step 514; and tuning the secondary receiver to a third network carrier frequency to perform GPS activities at step 516. After performing the GPS activities, the secondary receiver is disabled and the WCD is switched to use the primary transceiver for conducting communications in the second network at step 518; as a result, the secondary receiver is again used for simultaneously conducting wireless communications in the first network. The GPS activities may include a GPS location fix or GPS data demodulation. The process is performed at each first network paging slot, and the throughput and latency are improved over a Hybrid-mode operation because the traffic communications is not interrupted.

Antenna Requirements

There are no specific antenna design requirements imposed by the Simultaneous-mode aside from the requirement that at least two antennas exist as described above and illustrated in FIG. 2. Currently, the IS-98 and IS-856 performance standards and carrier requirements apply to the primary antenna. However, the ATs may differ greatly with respect to the design of the secondary antenna. This will cause varying performance in terms of an AT's ability to remain in the Simultaneous-mode. As such, carriers are encouraged to specify gain requirements on the secondary antenna which are suited to their specific networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    operating a wireless communication device (WCD) in a hybrid operation mode when a first transceiver of the WCD is not engaged in active data communication with a first network; and
    initiating active data communication with the first network using the first transceiver,
    wherein the WCD remains in the hybrid operation mode when the WCD is operating in low receiver power conditions,
    wherein the WCD transitions from the hybrid operation mode to a simultaneous operation mode when the WCD is not operating in low receiver power conditions,
    wherein in the hybrid operation mode, the WCD responds to a first slotted paging of a second network using the first transceiver, and
    wherein in the simultaneous operation mode, the WCD is configured to:
        conduct active data communication with the first network using the first transceiver and a second transceiver, and
        respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging.

2. The method of claim 1, wherein the first network is an Interim Standard (IS)-856 network and the second network is an Interim Standard (IS)-2000 network.

3. The method of claim 1, wherein responding to a particular slotted paging of the second network includes performing pilot set maintenance, overhead message maintenance, page match detection, 1x system acquisition attempts, 1x system synchronization attempts, or a combination thereof.

4. The method of claim 1, wherein in response to a subsequent slotted paging of the second network when the WCD is operating in the simultaneous operation mode, the WCD is configured to:
   disable the second transceiver;
   reconfigure the second transceiver to tune to a second network carrier frequency of the second network; and
   reconfigure the second transceiver to retune to a first network carrier frequency of the first network after responding to the subsequent slotted paging using the second transceiver.

5. The method of claim 1, wherein the WCD has an increased throughput and a decreased latency while operating in the simultaneous operation mode as compared to operating in the hybrid operation mode.

6. The method of claim 1, further comprising conducting active data communication with the first network using both a first antenna coupled to the first transceiver and a second antenna coupled to the second transceiver in the simultaneous operation mode.

7. A method comprising:
   operating a wireless communication device (WCD) in a hybrid operation mode when a first transceiver of the WCD is not engaged in active data communication with a first network; and
   initiating active data communication with the first network using the first transceiver,
   wherein the WCD remains in the hybrid operation mode when the WCD is operating in low receiver power conditions,
   wherein the WCD transitions from the hybrid operation mode to a simultaneous operation mode when the WCD is not operating in low receiver power conditions,
   wherein in the hybrid operation mode, the WCD responds to a first slotted paging of a second network using the first transceiver, and
   wherein in the simultaneous operation mode, the WCD is configured to:
      conduct active data communication with the first network using the first transceiver while communicating to the second network using a second transceiver, and
      respond to a global positioning system (GPS) session with a third network by reconfiguring the second transceiver to discontinue communicating with the second network and to perform GPS activities, by reconfiguring the first transceiver to conduct active data communication with the first network and to respond to a second slotted paging of the second network in a time multiplexed fashion, and by reconfiguring the second transceiver to resume communicating with the second network after performing the GPS activities.

8. The method of claim 7, wherein the GPS activities include a GPS location fix, GPS data demodulation, or a combination thereof.

9. The method of claim 7, wherein the first network is an Interim Standard (IS)-856 network and the second network is an Interim Standard (IS)-2000 network.

10. The method of claim 7, wherein the WCD operates in the hybrid operation mode for non-traffic-related operations of the first network.

11. The method of claim 7, wherein the WCD has an increased throughput and a decreased latency while operating in the simultaneous operation mode as compared to operating in the hybrid operation mode.

12. The method of claim 7, wherein the first network supports packet data services, the second network supports voice and data services and the third network supports GPS.

13. The method of claim 7, further comprising conducting active data communication with the first network using a first antenna coupled to the first transceiver, and simultaneously communicating with the second network using a second antenna coupled to the second transceiver in the simultaneous operation mode.

14. A method comprising:
   operating a wireless communication device (WCD) in a hybrid operation mode when a first transceiver of the WCD is not engaging in active data communication with a first network; and
   initiating active data communication with the first network using the first transceiver,
   wherein the WCD remains in the hybrid operation mode when the WCD is operating in low receiver power conditions,
   wherein the WCD transitions from the hybrid operation mode to a simultaneous operation mode when the WCD is not operating in low receiver power conditions,
   wherein in the hybrid operation mode, the WCD responds to a first slotted paging of a second network using the first transceiver, and
   wherein in the simultaneous operation mode, the WCD is configured to:
      conduct active data communication with the first network using the first transceiver and a second transceiver, and
      respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging, wherein the active data communication with the first network is uninterrupted via the first transceiver while the second transceiver responds to the second slotted paging.

15. The method of claim 14, wherein responding to a particular slotted paging of the second network includes sending registration attempts, call originations, access channel transmissions, or a combination thereof.

16. The method of claim 14, wherein the first slotted paging is different from the second slotted paging.

17. The method of claim 14, wherein the WCD has an increased throughput and a decreased latency while operating in the simultaneous operation mode as compared to operating in the hybrid operation mode.

18. The method of claim 14, wherein the first network supports packet data services and the second network supports voice and data services.

19. The method of claim 14, further comprising conducting active data communication with the first network using a first antenna couple to the first transceiver, and simultaneously communicating with the second network using a second antenna coupled to the second transceiver when responding to the second slotted paging.

20. A wireless communication device (WCD) comprising:
   a first transceiver;
   a second transceiver; and
   means for reconfiguring coupled to the second transceiver,
   wherein the WCD operates in a hybrid operation mode when the first transceiver is not engaged in active data communication with a first network, wherein the WCD initiates active data communication with the first network using the first transceiver, wherein the WCD remains in the hybrid operation mode when the WCD is operating in low receiver power conditions, wherein the WCD transitions from the hybrid operation mode to a simultaneous operation mode when the WCD is not operating in low receiver power conditions, wherein in the hybrid operation mode, the WCD responds to a first slotted paging of a second network using the first transceiver, and wherein in the simultaneous operation mode, the WCD is configured to:
conduct active data communication with the first network using both the first transceiver and the second transceiver, and
respond to a second slotted paging of the second network by reconfiguring the second transceiver via the means for reconfiguring to discontinue the active data communication with the first network and to respond to the second slotted paging and by reconfiguring the second transceiver via the means for reconfiguring to resume the active data communication with the first network after responding to the second slotted paging.

21. The wireless communication device of claim 20, wherein responding to a particular slotted paging of the second network includes performing pilot set maintenance, overhead message maintenance, page match detection, 1x system acquisition attempts, 1x system synchronization attempts, or a combination thereof.

22. The wireless communication device of claim 20, wherein the first network is an Interim Standard (IS)-856 network and the second network is an Interim Standard (IS)-2000 network.

23. The wireless communication device of 20, further comprising a first antenna coupled to the first transceiver and a second antenna coupled to the second transceiver for conducting wireless communications with the second network.

24. A wireless communication device (WCD) comprising:
a first transceiver;
a second transceiver; and
means for reconfiguring coupled to the second transceiver,
wherein the WCD operates in a hybrid operation mode when the first transceiver is not engaged in active data communication with a first network, wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver while communicating to the second network using the second transceiver, and
respond to a global positioning system (GPS) session with a third network by reconfiguring the second transceiver via the means for reconfiguring to discontinue communicating with the second network and to perform GPS activities, by reconfiguring the first transceiver via the means for reconfiguring to conduct active data communication with the first network and to respond to a second slotted paging of the second network in a time multiplexed fashion, and by reconfiguring the second transceiver by the means for reconfiguring to resume communicating with the second network after performing the GPS activities.

25. The wireless communication device of claim 24, wherein the GPS activities include a GPS location fix, GPS data demodulation, or a combination thereof.

26. The wireless communication device of claim 24, wherein the first network is an Interim Standard (IS)-856 network and the second network is an Interim Standard (IS)-2000 network.

27. The wireless communication device of claim 24, wherein the first network supports packet data services, the second network supports voice and data services and the third network supports GPS.

28. The wireless communication device of claim 24, further comprising a first antenna coupled to the first transceiver, and a second antenna coupled to the second transceiver.

29. A wireless communication device (WCD) comprising:
a first transceiver;
a second transceiver; and
means for reconfiguring coupled to the second transceiver,
wherein the WCD operates in a hybrid operation mode when the first transceiver is not engaged in active data communication with a first network, wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using both the first transceiver and the second transceiver,
respond to a second slotted paging of the second network by reconfiguring the second transceiver via the means for reconfiguring to discontinue the active data communication with the first network and to respond to the second slotted paging and by reconfiguring the second transceiver by the means for reconfiguring to resume the active data communication with the first network after responding to the second slotted paging, wherein the active data communication with the first network is uninterrupted via the first transceiver while the second transceiver responds to the second slotted paging.

30. The wireless communication device of claim 29, wherein responding to a particular slotted paging of the second network includes sending registration attempts, call originations, access channel transmissions, or a combination thereof.

31. The wireless communication device of claim 29, wherein the first network is an Interim Standard (IS)-856 network and the second network is an Interim Standard (IS)-2000 network.

32. The wireless communication of claim 29, wherein the first network supports packet data services and the second network supports voice and data services.

33. The wireless communication device of claim 29, further comprising a first antenna coupled to the first transceiver, and a second antenna coupled to the second transceiver.

34. A non-transitory computer readable media comprising processor-executable instructions that, when executed by a processor, cause the processor to:
operate in a hybrid operation mode when a first transceiver of a wireless communication device (WCD) is not engaged in active data communication with a first network; and
initiate active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver and a second transceiver, and
respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging.

35. A non-transitory computer readable media comprising processor-executable instructions that, when executed by a processor, causes the processor to:
operate in a hybrid operation mode when a first transceiver of a wireless communication device (WCD) is not engaged in active data communication with a first network; and
initiate active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver while communicating to the second network using a second transceiver, and
respond to a global positioning system (GPS) session with a third network by reconfiguring the second transceiver to discontinue communicating with the second network and to perform GPS activities, by reconfiguring the first transceiver to conduct active data communication with the first network and to respond to a second slotted paging of the second network in a time multiplexed fashion, and by reconfiguring the second transceiver to resume communicating with the second network after performing the GPS activities.

36. The non-transitory computer-readable medium of claim 35, wherein the first network supports packet data services, the second network supports voice and data services and the third network supports GPS.

37. A non-transitory computer readable media comprising processor-executable instructions that, when executed by a processor, cause the processor to:
operate in a hybrid operation mode when a first transceiver of a wireless communication device (WCD) is not engaged in active data communication with a first network; and
initiate active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver and a second transceiver, and
respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging, wherein the active data communication with the first network is uninterrupted via the first transceiver while the second transceiver responds to the second slotted paging.

38. The non-transitory computer-readable medium of claim 37, wherein the first network supports packet data services and the second network supports voice and data services.

39. A method comprising:
operating a wireless communication device (WCD) in a hybrid operation mode when a first transceiver of the WCD is not engaged in active data communication with a first network; and
initiating active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver and a second transceiver, and
respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging, wherein the first network supports packet data services and the second network supports voice and data services.

40. A wireless communication device (WCD) comprising:
a first transceiver;
a second transceiver;
means for reconfiguring coupled to the second transceiver,
wherein the WCD operates in a hybrid operation mode when the first transceiver is not engaged in active data communication with a first network,
wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
  conduct active data communication with the first network using both the first transceiver and the second transceiver, and
  respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging, wherein the first network supports packet data services and the second network supports voice and data services.

41. A non-transitory computer readable media comprising processor-executable instructions that, when executed by a processor, cause the processor to:
  operate in a hybrid operation mode when a first transceiver of a wireless communication device (WCD) is not engaged in active data communication with a first network; and
  initiate active data communication with the first network using the first transceiver,
  wherein the WCD remains in the hybrid operation mode when the WCD is operating in low receiver power conditions,
  wherein the WCD transitions from the hybrid operation mode to a simultaneous operation mode when the WCD is not operating in low receiver power conditions,
  wherein in the hybrid operation mode, the WCD responds to a first slotted paging of a second network using the first transceiver, and
  wherein in the simultaneous operation mode, the WCD is configured to:
    conduct active data communication with the first network using the first transceiver and a second transceiver, and
    respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging, wherein the first network supports packet data services and the second network supports voice and data services.

42. A wireless communication device (WCD) comprising:
a first transceiver;
a second transceiver; and
a controller coupled to the second transceiver,
wherein the WCD operates in a hybrid operation mode when the first transceiver is not engaged in active data communication with a first network,
wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
  conduct active data communication with the first network using both the first transceiver and the second transceiver, and
  respond to a second slotted paging of the second network by reconfiguring the second transceiver by the controller to discontinue the active data communication with the first network and to respond to the second slotted paging and by reconfiguring the second transceiver by the controller to resume the active data communication with the first network after responding to the second slotted paging, wherein the first network supports packet data services and the second network supports voice and data services.

43. The wireless communication device of claim 42, further comprising a first antenna coupled to the first transceiver and a second antenna coupled to a second transceiver.

44. A wireless communication device (WCD) comprising:
a first transceiver;
a second transceiver; and
a controller coupled to the second transceiver,
wherein the WCD operates in a hybrid operation mode when the first transceiver is not engaged in active data communication with a first network,
wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
  conduct active data communication with the first network using the first transceiver while communicating to the second network using the second transceiver, and
  respond to a global positioning system (GPS) session with a third network by reconfiguring the second transceiver by the controller to discontinue communicating with the second network and to perform GPS activities, by reconfiguring the first transceiver to conduct active data communication with the first network and to respond to a second slotted paging of the second network in a time multiplexed fashion, and by reconfiguring the second transceiver by the controller to resume communicating with the second network after performing the GPS activities.

45. The wireless communication device of claim 44, further comprising a first antenna coupled to the first transceiver, and a second antenna coupled to the second transceiver.

46. A method comprising:
operating a wireless communication device (WCD) in a hybrid operation mode when a first transceiver of the WCD is not engaged in active data communication with a first network; and
initiating active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using the first transceiver and a second transceiver, and
respond to a second slotted paging of the second network by transitioning the second transceiver to discontinue the active data communication with the first network and to respond to the second slotted paging and by transitioning the second transceiver to resume the active data communication with the first network after responding to the second slotted paging.

47. The method of claim 46, wherein a first antenna coupled to the first transceiver and a second antenna coupled to the second transceiver are physically separated from one another.

48. The method of claim 46, wherein the first network supports packet data services and the second network supports voice and data services.

49. The method of claim 46, wherein the first network comprises an Interim Standard (IS)-856 network and the second network comprises an Interim Standard (IS)-2000 network.

50. A wireless communication device (WCD) comprising:
a first transceiver;
a second transceiver; and
a controller coupled to the first transceiver and the second transceiver,
wherein the WCD operates in a hybrid operation mode when the first transceiver is not engaged in active data communication with a first network,
wherein the WCD initiates active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the controller responds to a first slotted paging of a second network using the first transceiver, and
wherein in the simultaneous operation mode, the controller is configured to:
conduct active data communication with the first network using the first transceiver and the second transceiver, and
respond to a second slotted paging of the second network by reconfiguring the second transceiver to discontinue the active data communication with the first network and to respond to the second slotted paging and by reconfiguring the second transceiver to resume the active data communication with the first network after responding to the second slotted paging.

51. The wireless communication device of claim 50, wherein a first antenna coupled to the first transceiver and a second antenna coupled to the second transceiver are physically separated from one another.

52. The wireless communication device of claim 50 wherein the first network supports packet data services and the second network supports voice and data services.

53. The wireless communication device of claim 50, wherein the first network comprises an IS-856 network and the second network comprises an IS-2000 network.

54. A wireless communication device (WCD) comprising:
a first transceiver coupled to a first antenna;
a second transceiver coupled to a second antenna;
means for transitioning coupled to the second transceiver,
wherein the WCD operates in a hybrid operation mode when the first transceiver is not engaged in active data communication with a first network; and
initiating active data communication with the first network using the first transceiver,
wherein the WCD remains in the hybrid operation mode when the WCD is operating in low receiver power conditions,
wherein the WCD transitions from the hybrid operation mode to a simultaneous operation mode when the WCD is not operating in low receiver power conditions,
wherein in the hybrid operation mode, the WCD responds to a first slotted paging of a second network using the first transceiver, and
wherein in the simultaneous operation mode, the WCD is configured to:
conduct active data communication with the first network using both the first transceiver and the second transceiver, and
respond a second slotted paging of the second network by transitioning the second transceiver via the means for transitioning to discontinue the active data communication with the first network and to respond to the second slotted paging and by transitioning the second transceiver via the means for transitioning to resume the active data communication with the first network after responding to the second slotted paging.

55. The wireless communication device of claim 54, wherein a first antenna coupled to the first transceiver and a second antenna coupled to the second transceiver are physically separated from one another.

56. The wireless communication device of claim 54, wherein the first network supports packet data services and the second network supports voice and data services.

57. The wireless communication device of claim 54, wherein the first network comprises an Interim Standard (IS)-856 network and the second network comprises an Interim Standard (IS-2000) network.

* * * * *